US012630132B2

(12) United States Patent
    Kim et al.

(10) Patent No.:     US 12,630,132 B2
(45) Date of Patent:        May 19, 2026

(54) PEDAL SIMULATOR FOR VEHICLE

(71) Applicant: HYUNDAI MOBIS CO., LTD., Seoul (KR)

(72) Inventors: Jin Hyun Kim, Yongin-si (KR); Myeon Gyu Cha, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/775,638

(22) Filed:     Jul. 17, 2024

(65)          Prior Publication Data

US 2025/0162553 A1      May 22, 2025

(30)      Foreign Application Priority Data

Nov. 21, 2023    (KR) ........................ 10-2023-0162288

(51) Int. Cl.
     *B60T 8/40*        (2006.01)
     *B60T 7/04*        (2006.01)
     *G05G 1/30*        (2008.04)
(52) U.S. Cl.
     CPC ................ *B60T 8/409* (2013.01); *B60T 7/04* (2013.01); *G05G 1/30* (2013.01)
(58) Field of Classification Search
     CPC .............. B60T 7/04; B60T 8/409; B60T 7/06
     See application file for complete search history.

(56)                 References Cited

FOREIGN PATENT DOCUMENTS

| CN | 118323070 | A | 7/2024 | |
|----|-----------|---|--------|---|
| JP | 2008-279795 | A | 11/2008 | |
| KR | 20130020048 | * | 2/2013 | ............... B60T 7/04 |
| KR | 10-2015-0051365 | A | 5/2015 | |
| KR | 10-2016-0000095 | A | 1/2016 | |
| KR | 10-1665709 | B1 | 10/2016 | |
| KR | 10-2223847 | B1 | 3/2021 | |
| KR | 20210108017 | A1 * | 8/2021 | ............... B60T 7/04 |

OTHER PUBLICATIONS

Office Action issued on Mar. 3, 2025 in the corresponding Chinese Patent Application No. 202421536736.6.
Office Action issued on Aug. 29, 2025 in the corresponding Korean Patent Application No. 10-2023-0162288.

* cited by examiner

*Primary Examiner* — Abiy Teka
(74) *Attorney, Agent, or Firm* — Morgan, Lewis & Bockius LLP

(57)              ABSTRACT

A pedal simulator according to the present disclosure includes: a housing; a piston slidably mounted in the housing to be movable in the housing; and an elastic part formed in a hollow shape and elastically supporting the piston inside the housing, and configured to be compressed by pressurization of the piston.

18 Claims, 10 Drawing Sheets

PEDAL SIMULATOR FOR VEHICLE

CROSS-REFERENCE TO RELATED APPLICATION

This application claims priority from and the benefit of Korean Patent Application No. 10-2023-0162288, filed on Nov. 21, 2023, which is hereby incorporated by reference for all purposes as if set forth herein.

BACKGROUND

Field

Exemplary embodiments of the present disclosure relate to a pedal simulator for a vehicle, and more particularly, to a pedal simulator for a vehicle, which may provide a braking feel.

Discussion of the Background

An electro-mechanical brake typically employs a hydraulic system. In recent years, with the rise of technologies related to a brake-by-wire system and an autonomous vehicle, the development of a non-hydraulic brake system has been required.

A pedal simulator is a component mounted on an electro-mechanical brake or an electronic booster (e.g., vacuum-less electronic boost (VEB), and provides a driver with a braking feel generated by a conventional mechanical (hydraulic) brake.

A conventional pedal simulator uses a single or a plurality of springs and dampers so as to provide a braking feel similar to that of a mechanical booster. However, there occurs a problem that the number of components and the shape complexity should be increased to have a greater similarity with the mechanical booster.

The background technology of the present disclosure is disclosed in Korean Patent No. 10-2223847 (registered on Mar. 8, 2021 and entitled "PEDAL SIMULATOR").

SUMMARY

An object of the present disclosure is to provide a pedal simulator for a vehicle that may optimize the structure and simplify the shape, thereby improving ease of assembly and productivity and reducing cost and weight.

Another object of the present disclosure is to provide a pedal simulator for a vehicle that is applicable regardless of the type and shape of a pedal.

According to an aspect of the present disclosure, there is provided a pedal simulator for a vehicle, which may include: a housing; a piston slidably mounted in the housing to be movable in the housing; and an elastic part formed in a hollow shape and elastically supporting the piston inside the housing, and configured to be compressed by pressurization of the piston.

The piston may include: a piston body positioned inside the housing and including a ball; a piston pressurization part mounted on one side of the piston body and including a socket, which is rotatably coupled to the ball; and a piston rod formed on the other side of the piston body, wherein the elastic part is mounted on the piston rod.

The piston rod includes an opening on one end thereof, and may be formed in a hollow shape.

A first part of the elastic part may be accommodated inside the piston rod.

The housing may include: a hollow portion, in which the piston is movably accommodated; a solid portion, which is provided on one side of the hollow portion and inserted into a portion of the elastic part; and a guide, which is formed on an outer side of the solid portion and communicates with the hollow portion, and into which a second part of the elastic part is inserted.

The piston body may be formed to have a larger diameter than the piston rod.

The housing may include a slit-hole penetrating an outer peripheral surface of the housing, and may further include a retainer, which penetrates the slit-hole to be coupled to the housing and interferes with the piston pressurization part to prevent the piston from being dislodged.

The retainer may be formed in a ring shape with one side thereof open.

The piston may further include a magnet, which is provided on an outer peripheral surface of the piston body and formed along a circumferential direction of the piston body.

The pedal simulator may further include a sensor, which is provided on the housing and detects a position of the magnet.

The elastic part may include: a plurality of first elastic portions, which are arranged, in a longitudinal direction of the housing, to be spaced apart from each other; and a plurality of second elastic portions, which are arranged, in a longitudinal direction of the housing, to be spaced apart from each other, and are disposed alternately with the first elastic portions.

Each of the first elastic portions may include: a first inclination portion, which is formed to be inclined at a predetermined angle toward a first direction; a second inclination portion, which is formed to be inclined at a predetermined angle toward a second direction so as to form an acute or obtuse angle with the first inclination portion; and a folding portion, which is provided between the first inclination portion and the second inclination portion, and is folded and deformed by the pressurization of the piston.

The folding portion may include a through-hole.

A plurality of the through-holes may be arranged, along a circumferential direction of the folding portion, to be spaced apart from each other.

Each of the second elastic portions may include: a connection portion, which connects between the plurality of the first elastic portions; and a protrusion, which is formed to protrude from an outer surface of the connection portion and is provided along a circumferential direction of the connection portion.

The second elastic portions may further include a recess, which is formed to be concavely recessed on an outer peripheral surface of the protrusion, and is provided along a circumferential direction of the protrusion.

According to another aspect of the present disclosure, there is provided a pedal simulator for a vehicle, which may include: a housing detachably coupled to a pedal; a piston slidably mounted in the housing to be movable in the housing; and an elastic part formed in a hollow shape and elastically supporting the piston inside the housing, and configured to be compressed by pressurization of the piston.

The pedal simulator may further include a bracket mounted on the housing and coupled to the pedal.

A plurality of the brackets may be disposed, on an outer surface of the housing, to be spaced apart from each other.

According to the present disclosure, the pedal simulator may eliminate a pedal return spring through the elastic part, which elastically supports the piston.

In addition, according to the present disclosure, the pedal simulator may be employed regardless of the type and shape of a pedal through modularization, and the modularization may enable the pedal simulator to be commonly used for various types of pedals, thereby reducing repair and replacement cost and improving productivity.

In addition, according to the present disclosure, the pedal simulator may adjust pedal effort based on the length, material, hardness, and the like of the elastic part.

In addition, according to the present disclosure, the pedal simulator may adjust the pedal effort based on the thickness and angle of the first inclination portion and the second inclination portion, the thickness of the second elastic portion, and the size of the recess.

In addition, according to the present disclosure, the pedal simulator may measure a pedal stroke through the magnet, which is integrally provided in the piston.

BRIEF DESCRIPTION OF THE DRAWINGS

FIG. 4 is an exploded perspective view illustrating the pedal simulator for a vehicle, when viewed from one direction, according to an embodiment of the present disclosure.

FIG. 5 is an exploded perspective view illustrating the pedal simulator for a vehicle of FIG. 4, when viewed from another direction.

DETAILED DESCRIPTION OF THE ILLUSTRATED EMBODIMENTS

Figure 1:
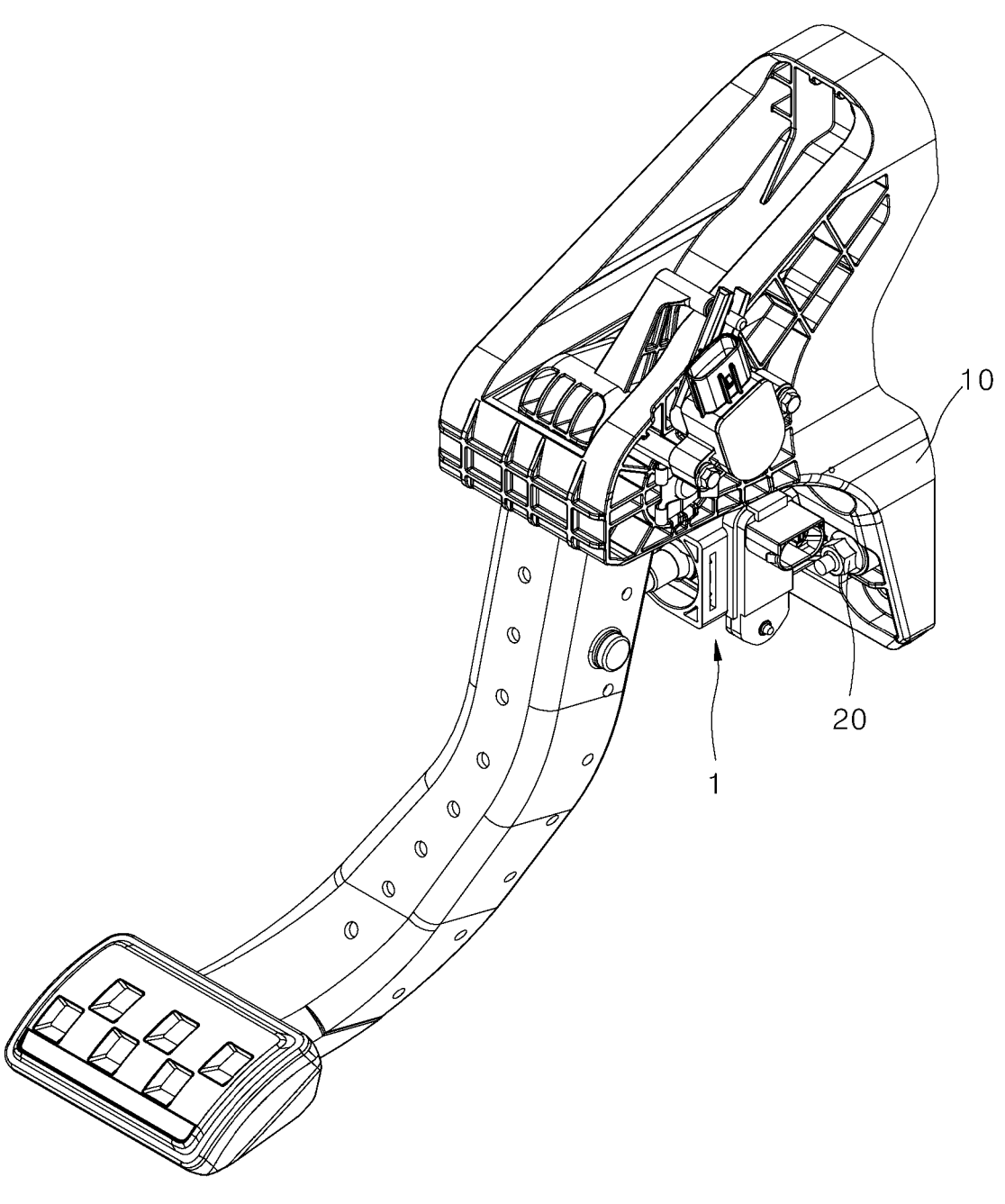
FIG. 1 is a perspective view illustrating a pedal simulator for a vehicle mounted on a pendant-type pedal according to an embodiment of the present disclosure.

Exemplary embodiments of a pedal simulator for a vehicle will be described below with reference to the accompanying drawings. It should be considered that the thickness of each line or the size of each component in the drawings may be exaggeratedly illustrated for clarity and convenience of description. In addition, the terms as used herein are defined in consideration of functions of the present disclosure, and these terms may change depending on a user or operator's intention or practice. Therefore, these terms should be defined based on the entirety of the disclosure set forth herein.

FIG. 1 is a perspective view illustrating the pedal simulator for a vehicle mounted on a pendant-type pedal according to an embodiment of the present disclosure.

Referring to FIG. 1, the pedal simulator 1 for a vehicle according to an embodiment of the present disclosure may be detachably mounted regardless of the type and shape of a pedal 10, such as a pendant-type pedal, an organ-type pedal, and the like. Thus, the pedal simulator 1 for a vehicle of the present disclosure may be modularized so as to be readily assembled and mounted on the pedal 10, such as the pendant-type pedal, the organ-type pedal, and the like, thereby enabling commonization of the product.

The pedal simulator 1 for a vehicle of the present disclosure may be readily assembled by coupling a bracket 150, which is provided on a housing 100, to the pendant-type pedal or to the organ-type pedal by means of a coupling member 20, such as a bolt, a nut, and the like.

Figure 2:
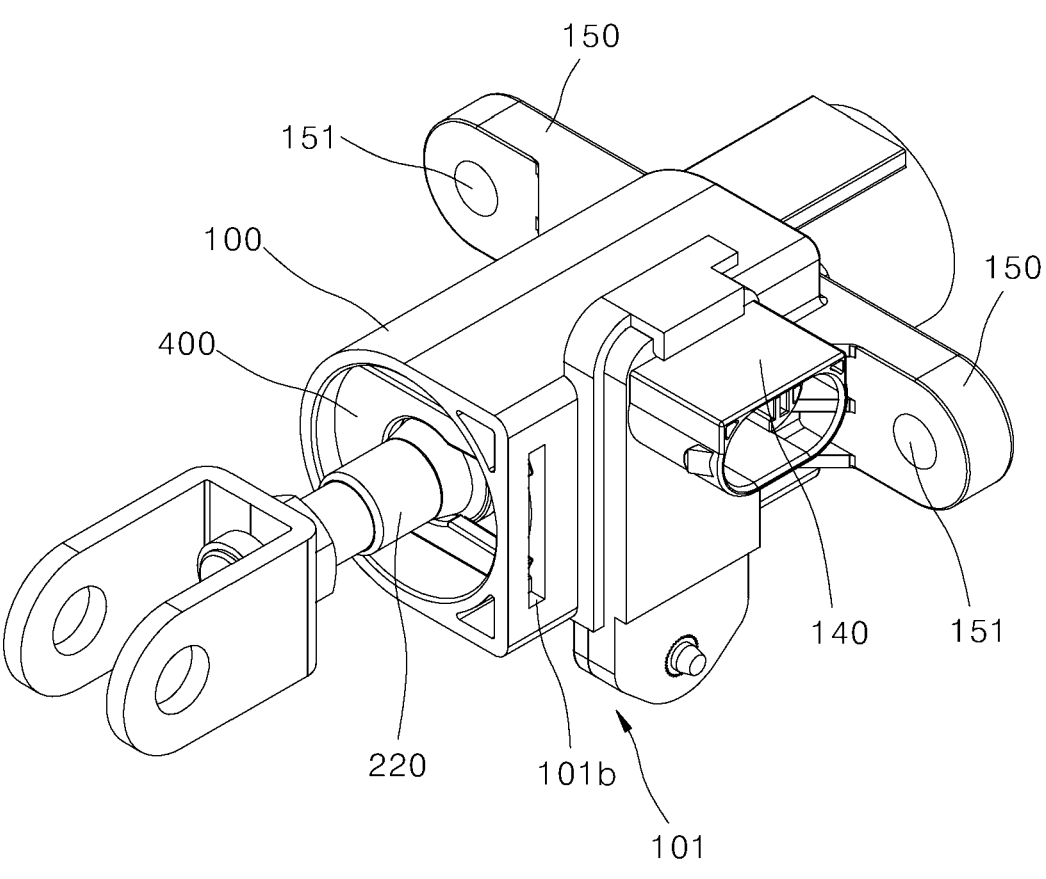
FIG. 2 is an exterior perspective view illustrating the pedal simulator for a vehicle, when viewed from one direction, according to an embodiment of the present disclosure.
Figure 3:
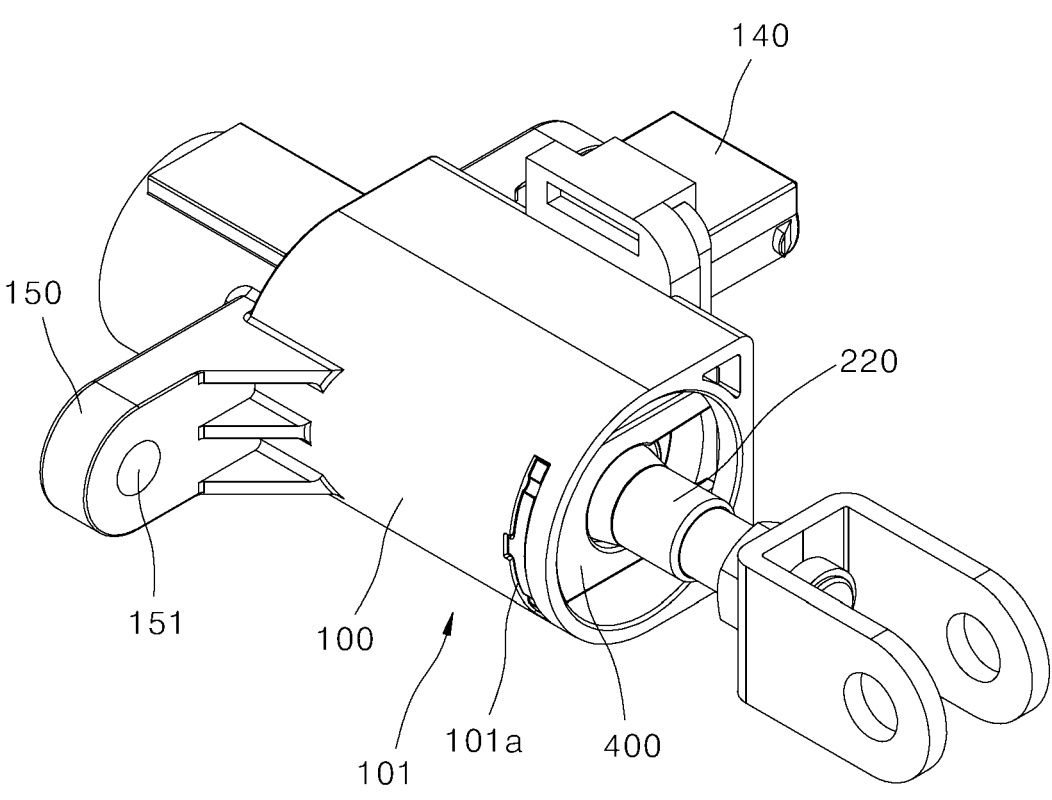
FIG. 3 is an exterior perspective view illustrating the pedal simulator for a vehicle of FIG. 2, when viewed from another direction.
Figure 4:
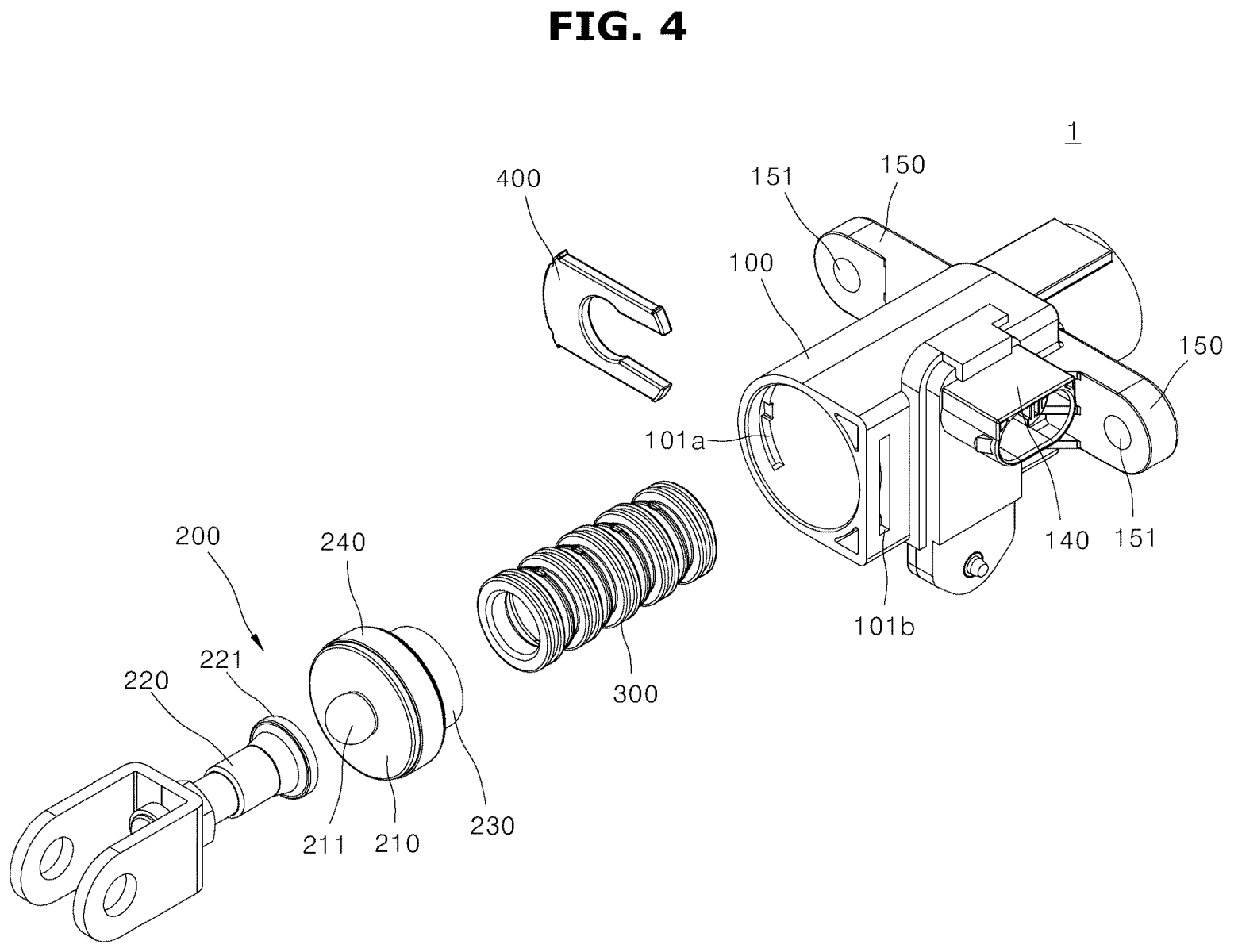
Figure 5:
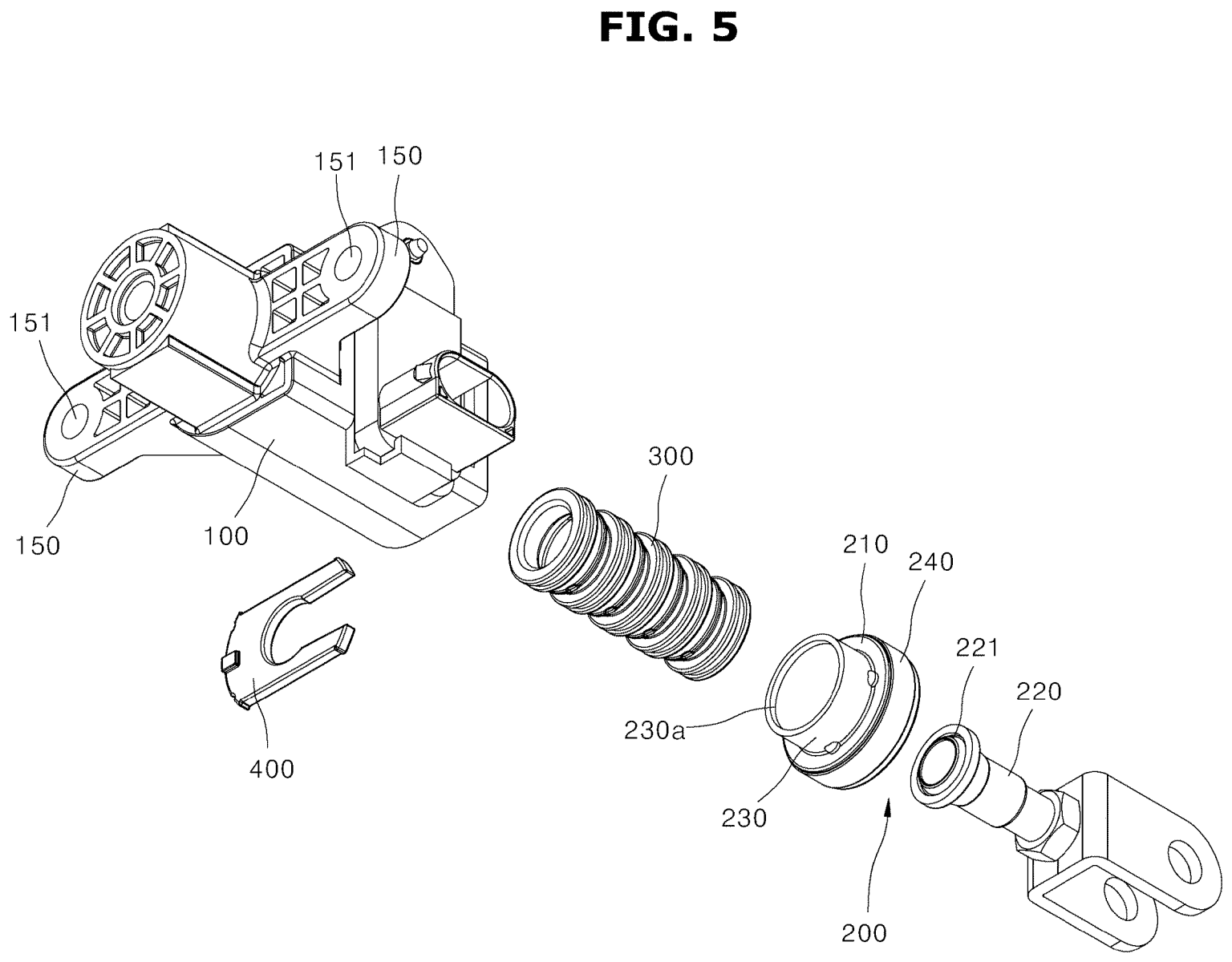
Figure 6:
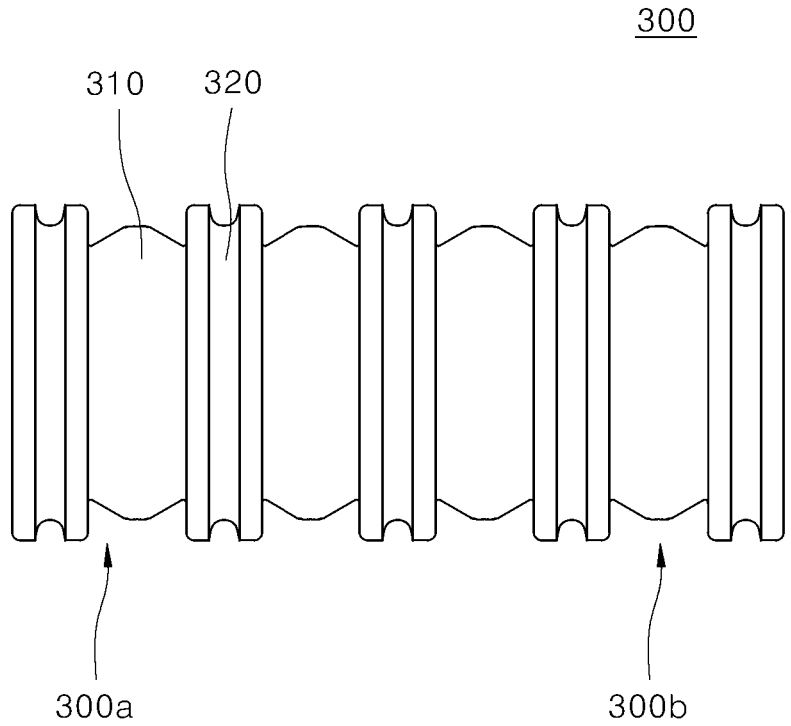
FIG. 6 is a side view illustrating an elastic part in the pedal simulator for a vehicle according to an embodiment of the present disclosure.
Figure 7:
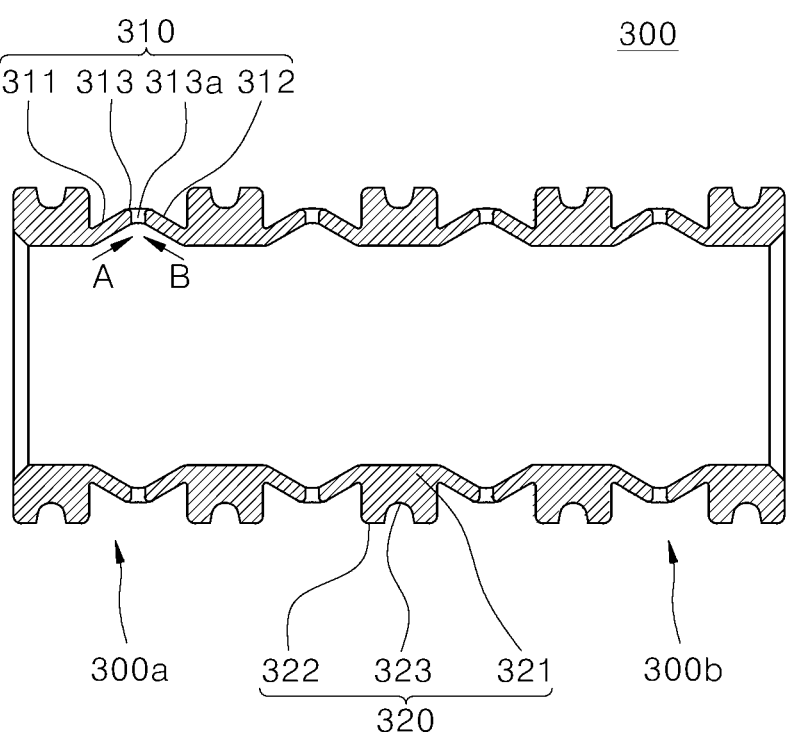
FIG. 7 is a cross-sectional view illustrating the elastic part in the pedal simulator for a vehicle according to an embodiment of the present disclosure.

FIG. 2 is an exterior perspective view illustrating the pedal simulator for a vehicle, when viewed from one direction, according to an embodiment of the present disclosure. FIG. 3 is an exterior perspective view illustrating the pedal simulator for a vehicle of FIG. 2, when viewed from another direction. FIG. 4 is an exploded perspective view illustrating the pedal simulator for a vehicle, when viewed from one direction, according to an embodiment of the present disclosure. FIG. 5 is an exploded perspective view illustrating the pedal simulator for a vehicle of FIG. 4, when viewed from another direction. FIG. 6 is a side view illustrating an elastic part in the pedal simulator according to an embodiment of the present disclosure. FIG. 7 is a cross-sectional view illustrating the elastic part in the pedal simulator according to an embodiment of the present disclosure.

Referring to FIGS. 2 to 7, FIGS. 9 and 10, the pedal simulator 1 for a vehicle according to an embodiment of the present disclosure includes the housing 100, a piston 200, and the elastic part 300, which are described in detail below.

The housing 100 may include a hollow portion 110, a solid portion 120, and a guide 130.

The hollow portion 110 is provided inside the housing 100, and may be formed in a hollow shape having a predetermined length. The piston 200, which will be described later, may be movably accommodated in the hollow portion 110.

The hollow portion 110 may guide a linear movement of a piston body 210, which will be described later. An opening communicating with the hollow portion 110 is provided on an outer surface (the left side in FIG. 9) of the housing 100. The hollow portion 110 may be formed as a cylindrical groove.

The hollow portion 110 may include a first hollow portion 111 and a second hollow portion 112 having a smaller inner diameter than the first hollow portion 111. Thus, a stepped portion 113, which is bent inward toward the inside of the housing 100, with a change in height, may be formed between the first hollow portion 111 and the second hollow portion 112. The piston body 210 may be seated on the stepped portion 113, thereby limiting movement of the piston body 210.

The solid portion 120 is provided inside the housing 100, and is provided on one side (the right side in FIG. 9) of the hollow portion 110. The solid portion 120 may be formed in a solid shape having a predetermined length.

The second hollow portion 112 may be formed to have a larger diameter than the solid portion 120. The solid portion may be inserted into the elastic part 300, which will be described later, to support the elastic part 300.

The guide 130 is provided on the inside of the housing 100, and is provided on the outside of the solid portion 120. To be more specific, the guide 130 is provided between the housing 100 and the solid portion 120, and is formed along a circumferential direction of the solid portion 120. The guide 130 communicates with the first hollow portion 111. The elastic part 300 may be inserted into the guide 130 so that the elastic direction of the elastic part 300 may be guided.

The housing 100 may be detachably coupled to the pedal 10 such as the pendant-type pedal, the organ-type pedal, and the like. The housing 100 includes the bracket 150, which is coupled to the pedal 10. The bracket 150 may be formed to protrude from an outer surface of the housing 100, and a plurality of the brackets 150 may be arranged to be spaced apart from each other.

The bracket 150 may include a hole 151. The hole 151 may be formed by penetrating the bracket 150. The bracket 150 may be coupled to the coupling hole formed in the pedal 10 by means of the coupling member 20, such as a bolt, a nut, and the like. Thus, the housing 100 may remain stably coupled to the pedal 10, and rotation of the housing 100 may be prevented.

The housing 100 may further include a sensor 140. The sensor 140 may be mounted on the outer surface of the housing 100. The sensor 140 may be electrically connected to a vehicle controller (not illustrated), and may detect a position of a magnet 240, which will be described later.

The piston 200 is arranged to be slidably movable in the housing 100. The piston 200 may include the piston body 210, a piston pressurization part 220, and a piston rod 230.

The piston body 210 is positioned inside the housing 100. The piston body 210 may be accommodated in the hollow portion 110. To be more specific, the piston body 210 may be movably accommodated in the first hollow portion 111. The piston body 210 may be formed in a flat plate shape.

The piston body 210 may include a ball 211 in a sphere shape. The ball 211 may be formed to protrude from an outer surface of the piston body 210 facing the piston pressurization part 220, which will be described later. A socket 221 of the piston pressurization part 220 may be coupled to the ball 211.

The piston pressurization part 220 is mounted on the piston body 210. To be more specific, the piston pressurization part 220 is mounted on the ball 211. The piston pressurization part 220 may be exposed through the opening of the housing 100. The piston pressurization part 220 moves to one side (the right side in FIG. 9) when an external force is applied.

The piston pressurization part 220 may be rotatably coupled, in a joint manner, to the piston body 210. To be more specific, the socket 221 provided on the piston pressurization part 220 may be rotatably coupled to the ball 211 provided on the piston body 210.

In addition, the piston body 210 may be coupled to the piston pressurization part 220 by caulking. For example, by pressing an opening of the socket 221 toward the piston body 210 for caulking, the piston pressurization part 220, which is moved by the external force, may remain rotatably coupled to the ball 212. In addition, the piston body 210 may be caulked to the piston pressurization part 220, thereby saving assembly time and cost.

The piston rod 230 is provided on one side (the right side in FIG. 9) of the piston body 210. To be more specific, the piston rod 230 may be formed on the outer surface of the piston body 210

The piston rod 230 may be movably accommodated in the hollow portion 110. The piston body 210 may be formed to have a larger diameter than the piston rod 230.

The piston rod 230 has an opening 230a on one end (the right side in FIG. 9) facing the solid portion 120, and may be formed in a hollow shape. The piston rod 230 may be formed in a cylindrical shape having a predetermined length. The elastic part 300 may be mounted on the piston rod 230.

The piston 200 may include the magnet 240. The magnet 240 may be provided on an outer peripheral surface of the piston body 210. The magnet 240 may be integrally formed with the piston body 210 by insert injection.

The magnet 240 may be formed along a circumferential direction of the piston body 210. Thus, the position of the magnet 240 may be detected regardless of a mounting position of the sensor 140 mounted on the housing 100.

The magnet 240 may measure position information of the piston 200. The magnet 240 is a magnet having a magnetic force. When the magnet 240 moves along with the piston 200, a magnetic field changes. Based on the change in the magnetic field, the magnet 240 transmits pedal effort information applied by the piston 200 or the position information of the piston 200, through the sensor 140, to the vehicle controller.

The elastic part 300 elastically supports the piston 200 inside the housing 100. The elastic part 300 may be formed in an empty hollow shape. To be more specific, the elastic part 300 may be formed in a cylindrical shape having a predetermined length.

The elastic part 300 may include an elastically deformable plastic material, such as thermoplastic elastomer (TPE), thermoplastic vulcanizate (TPV), urethane, and the like. The elastic part 300 may be injection molded.

A first part 300a (the left side in FIG. 9) of the elastic part 300 may be accommodated inside the piston rod 230 through the opening 230a of the piston rod 230 and come into contact with an inner surface of the piston rod 230. A second part 300b (the right side in FIG. 9) of the elastic part 300 may be inserted into the guide 130 and come into contact with an inner surface of the second hollow portion 112. The elastic part 300 may provide an elastic force to the piston body 210, which is moved by the external force applied to the piston pressurization part 220.

The first part 300a of the elastic part 300 may be press-fit coupled to the inner surface of the piston rod 230 through the opening 230a of the piston rod 230, thereby restraining rotation of the piston 200 moving in the housing 100.

The elastic part 300 is compressed by the piston body 210, which is moved by the external force applied to the piston pressurization part 220. The compressed elastic part 300 may provide an elastic force (an elastic resilience) to the piston body 210, thereby returning the piston body 210 back to its original position.

The elastic part 300 may include a first elastic portion 310 and a second elastic portion 320.

A plurality of the first elastic portions 310 may be arranged, in a longitudinal direction of the housing 100, to be spaced apart from each other. To be more specific, the first elastic portions 310 may be arranged, along an axial direction of the elastic part 300, to be spaced apart from each other.

Each of the first elastic portions 310 may include a first inclination portion 311, a second inclination portion 312, and a folding portion 313.

The first inclination portion 311 may be formed to be inclined at a predetermined angle toward a first direction A.

Here, the first direction A refers to a direction inclined toward an outer side of the elastic part 300.

The second inclination portion 312 may be connected to the first inclination portion 311. The second inclination portion 312 may be formed to be inclined at a predetermined angle toward a second direction B so as to form an acute or obtuse angle with the first inclination portion 311. Here, the second direction B refers to a direction inclined toward the outer side of the elastic part 300.

The folding portion 313 may be provided between the first inclination portion 311 and the second inclination portion 312. The folding portion 313 may be formed at a portion connecting the first inclination portion 311 and the second inclination portion 312. The folding portion 313 may be located on the outer side of the elastic part 300. The folding portion 313 may be folded and deformed by pressurization of the piston 200.

The folding portion 313 may include a through-hole 313a. The through-hole 313a may be formed by penetrating an outer peripheral surface of the folding portion 313. A plurality of the through-holes 313a may be arranged, along a circumferential direction of the folding portions 313, to be spaced apart from each other. The through-hole 313a is a passage through which air flows in and out of the elastic part 300. When the elastic part 300 is compressed, the air inside the elastic part 300 may flow to the outside of the elastic part 300 through the through-hole 313a.

A plurality of the second elastic portions 320 may be arranged, in the longitudinal direction of the housing 100, to be spaced apart from each other, and may be disposed alternately with the first elastic portions 300. The second elastic portions 320 may be arranged, along an axial direction of the elastic part 300, to be spaced apart from each other. Each of the second elastic portions 320 may include a connection portion 321 and a protrusion 322.

The connection portion 321 may connect between the plurality of the first elastic portions 310. The connection portion 321 may connect between the first inclination portion 311 and the second inclination portion 312, which are spaced apart from each other, in a straight line.

The protrusion 322 may be provided on the connection portion 321. The protrusion 322 may be formed to protrude from an outer surface of the connection portion 321, and may be provided along a circumferential direction of the connection portion 321. To be more specific, the protrusion 322 may protrude in a radial direction of the elastic part 300.

The second elastic portion 320 may further include a recess 323. The recess 323 may be provided on the protrusion 322. The recess 323 may be concavely recessed on an outer peripheral surface of the protrusion 322, and may be provided along a circumferential direction of the protrusion 322. The recess 323 may be in a relief shape to enhance injectability of the elastic part 300 during injection molding of the elastic part 300.

Figure 8:
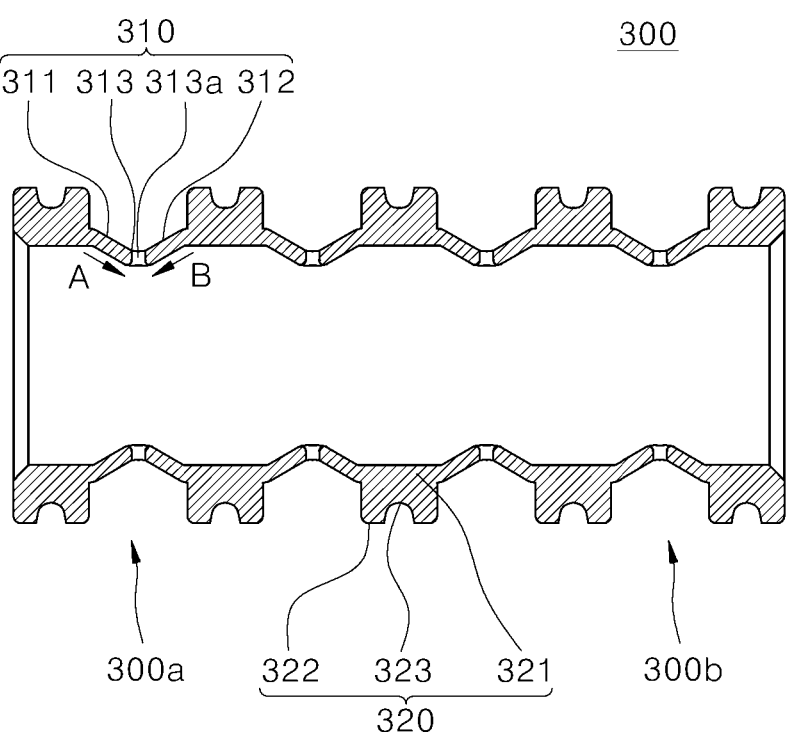
FIG. 8 is a partially enlarged cross-sectional view illustrating the elastic part of FIG. 7 according to another embodiment of the present disclosure.

FIG. 8 is a partially enlarged cross-sectional view illustrating the elastic part 300 in the pedal simulator for a vehicle according to another embodiment of the present disclosure.

Referring to FIG. 8, the first elastic portion 310 may include the first inclination portion 311, the second inclination portion 312, and the folding portion 313.

The first inclination portion 311 may be formed to be inclined at a predetermined angle toward the first direction A. Here, the first direction A refers to a direction inclined toward an inner side of the elastic part 300.

The second inclination portion 312 may be connected to the first inclination portion 311. The second inclination portion 312 may be formed to be inclined at a predetermined angle toward the second direction B so as to form an acute or obtuse angle with the first inclination portion 311. Here, the second direction B refers to a direction inclined toward the inner side of the elastic part 300.

The folding portion 313 may be provided between the first inclination portion 311 and the second inclination portion 312. The folding portion 313 may be formed at a portion connecting the first inclination portion 311 and the second inclination portion 312. The folding portion 313 may be located on the inner side of the elastic part 300. The folding portion 313 may be folded and deformed by the pressurization of the piston 200.

The pedal simulator 1 for a vehicle according to an embodiment of the present disclosure may further include a retainer 400.

The housing 100 may include a slit-hole 101. The slit-hole 101 may be formed by penetrating an outer peripheral surface of the housing 100. The slit-hole 101 may include a first slit-hole 101a and a second slit-hole 101b located on the opposite side of the first slit-hole 101a.

The retainer 400 may be formed in a ring shape with one side thereof open. The retainer 400 may penetrate the first slit-hole 101a, and a free end of the retainer 400 may be inserted into the second slit-hole 101b, thereby coupling the retainer 400 to the housing 100.

The retainer 400 may interfere with the piston pressurization part 220 to prevent the piston 200 from being dislodged in an axial direction through the opening of the housing 100.

The following is the description of an operation process of the pedal simulator for a vehicle with the configuration described above according to an embodiment of the present disclosure.

Figure 9:
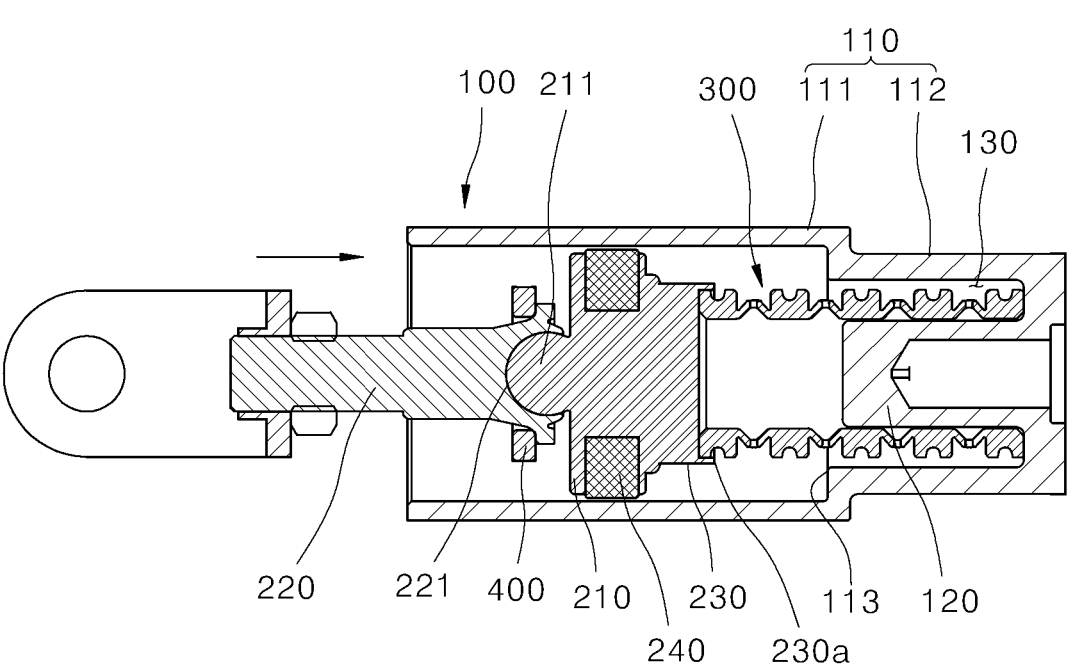
FIG. 9 is a cross-sectional view illustrating an operation status of an initial breaking phase of the pedal simulator for a vehicle according to an embodiment of the present disclosure.
Figure 10:
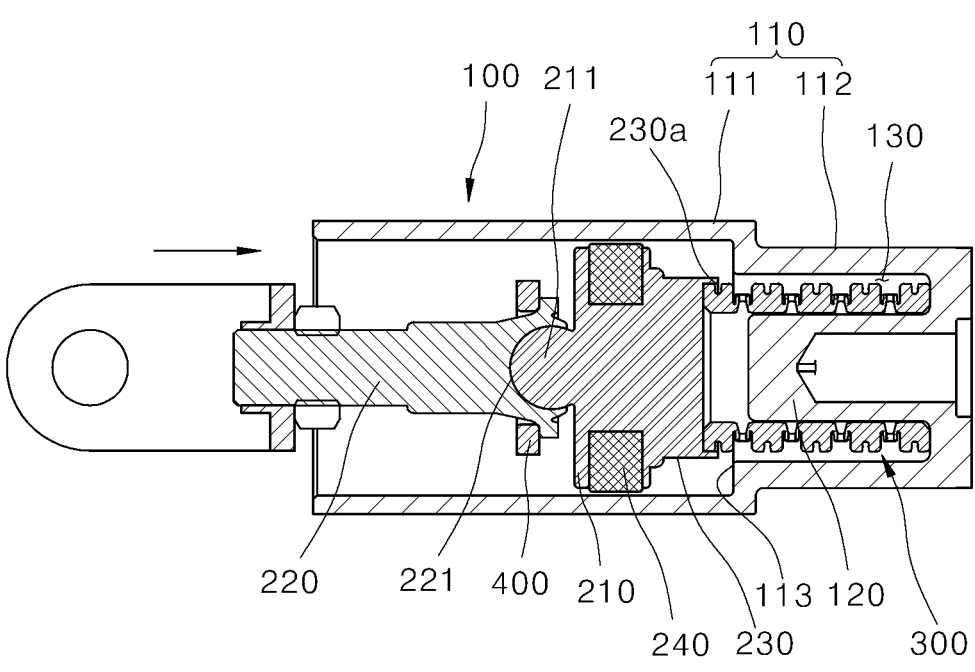
FIG. 10 is a cross-sectional view illustrating an operation status of mid-to-late braking phases of the pedal simulator for a vehicle according to an embodiment of the present disclosure.

FIG. 9 is a cross-sectional view illustrating an operation status of an initial breaking phase of the pedal simulator for a vehicle according to an embodiment of the present disclosure, and FIG. 10 is a cross-sectional view illustrating an operation status of mid-to-late braking phases of the pedal simulator for a vehicle according to an embodiment of the present disclosure.

Referring to FIG. 9, when the piston pressurization part 220 is pressed by an external force, the piston rod 230 moves toward the solid portion 120. As the piston rod 230 moves, the first elastic portion 310 is compressively deformed by pressurization of the piston body 210.

To be more specific, when the piston body 210 presses the elastic part 300 due to the movement of the piston rod 230, the folding portion 313 is folded and deformed. As a result, the angle between the first inclination portion 311 and the second inclination portion 312 becomes smaller. When the first elastic portion 310 is compressed, a user may notice a braking feel of the initial phase.

In this case, a position of the magnet 240, which is moved by the piston 200, is detected by the sensor 140. Based on a change in the magnetic field, the sensor 140 transmits the position information or the pedal effort information of the piston 200 to the vehicle controller.

Referring to FIG. 10, as the external force continues to be applied to the piston pressurization part 220, the piston rod 230 moves. The piston body 210 then presses the elastic part 300, and thus the second elastic portion 320 may be compressively deformed by the pressurization of the piston body 210. As a result, a user may notice a braking feel of the mid-to-late phases.

In this case, a position of the magnet 240, which is moved by the piston 200, is detected by the sensor 140. Based on a change in the magnetic field, the sensor 140 transmits the position information or the pedal effort information of the piston 200 to the vehicle controller. When the external force applied to the piston pressurization part 220 is released, the compressed elastic part 300 provides an elastic force (an elastic resilience) to the piston body 210, thereby returning the piston body 210 back to its original position.

The pedal simulator 1 for a vehicle according to an embodiment of the present disclosure may eliminate a pedal return spring through the elastic part 300, which elastically supports the piston 200.

The pedal simulator 1 for a vehicle according to an embodiment of the present disclosure may become applicable regardless of the type and shape of the pedal 10 through modularization. The modularization enables the pedal simulator 1 to be commonly used for various types of the pedal 10, thereby reducing repair and replacement cost and improving productivity.

The pedal simulator 1 for a vehicle according to an embodiment of the present disclosure may adjust the pedal effort based on the length, material, hardness, and the like of the elastic part 300.

The pedal simulator 1 for a vehicle according to an embodiment of the present disclosure may adjust the pedal effort based on the thickness and angle of the first inclination portion 311 and the second inclination portion 312, the thickness of the second elastic portion 320, and the size of the recess 323.

The pedal simulator 1 for a vehicle according to an embodiment of the present disclosure may measure a pedal stroke through the magnet 240, which is integrally provided in the piston 200.

The present disclosure has been described with reference to the embodiments illustrated in the drawings, but these are only exemplary. Those skilled in the art to which the technology pertains should understand that various modifications and other equivalent embodiments may be made without departing from the spirit and scope of the disclosure as defined in the following claims. Therefore, the true technical protection scope of the present disclosure will be determined by the following claims.

What is claimed is:

1. A pedal simulator for a vehicle, the pedal simulator comprising:
a housing;
a piston slidably mounted in the housing to be movable in the housing; and
an elastic part formed in a hollow and cylindrical shape including a through-hole formed in a closed curve and elastically supporting the piston inside the housing, and configured to be compressed by pressurization of the piston,
wherein the elastic part includes a folding portion and the through-hole is formed in the folding portion.

2. The pedal simulator of claim 1, wherein the piston includes:
a piston body positioned inside the housing and including a ball;
a piston pressurization part disposed on a first side of the piston body and including a socket rotatably coupled to the ball; and
a piston rod formed on a second side of the piston body, wherein the elastic part is mounted on the piston rod.

3. The pedal simulator of claim 2, wherein the piston rod includes an opening on an end of the piston rod and is formed in a hollow shape.

4. The pedal simulator of claim 3, wherein a first part of the elastic part is accommodated inside the piston rod through the opening of the piston rod.

5. The pedal simulator of claim 2, wherein the housing further includes:
a hollow portion, wherein the piston is movably accommodated in the hollow portion;
a solid portion formed on one side of the hollow portion and inserted into a portion of the elastic part; and
a guide formed on an outer side of the solid portion and configured to communicate with the hollow portion, wherein a second part of the elastic part is inserted into the guide and mounted on the solid portion.

6. The pedal simulator of claim 5, wherein a diameter of the piston body is larger than a diameter of the piston rod.

7. The pedal simulator of claim 2, further including:
a retainer,
wherein the housing further includes a slit-hole penetrating an outer peripheral surface of the housing, and
wherein the retainer penetrating the slit-hole is coupled to the housing and configured for interfering with the piston pressurization part to prevent the piston from being dislodged from the housing.

8. The pedal simulator of claim 7, wherein the retainer is formed in a ring shape with one side thereof open.

9. The pedal simulator of claim 2, wherein the piston further includes a magnet mounted on an outer peripheral surface of the piston body and formed along a circumferential direction of the piston body.

10. The pedal simulator of claim 9, further including:
a sensor mounted on the housing and detecting a position of the magnet.

11. The pedal simulator of claim 1, wherein the elastic part includes:
a plurality of first elastic portions arranged, in a longitudinal direction of the housing, to be spaced apart from each other; and
a plurality of second elastic portions arranged, in the longitudinal direction of the housing, to be spaced apart from each other, and disposed alternately with the first elastic portions.

12. The pedal simulator of claim 11, wherein each of the first elastic portions includes:
a first inclination portion formed to be inclined at a predetermined angle toward a first direction;
a second inclination portion formed to be inclined at a predetermined angle toward a second direction so as to form an acute or obtuse angle with the first inclination portion; and
the folding portion provided between the first inclination portion and the second inclination portion, and configured to be folded and deformed by the pressurization of the piston.

13. The pedal simulator of claim 12, wherein the through-hole is in plural and the plurality of the through-holes are formed, along a circumferential direction of the folding portion, to be spaced apart from each other.

14. The pedal simulator of claim 11, wherein each of the second elastic portions includes:
a connection portion connecting between the plurality of the first elastic portions; and
a protrusion formed to protrude from an outer surface of the connection portion and formed along a circumferential direction of the connection portion.

15. The pedal simulator of claim 14, wherein each second elastic portion includes a recess formed to be concavely recessed on an outer peripheral surface of the protrusion and formed along a circumferential direction of the protrusion.

16. A pedal simulator for a vehicle, the pedal simulator comprising:

a housing detachably coupled to a pedal;

a piston slidably mounted in the housing to be movable in the housing; and an elastic part formed in a hollow and cylindrical shape including a through-hole formed in a closed curve and elastically supporting the piston inside the housing, and configured to be compressed by pressurization of the piston, wherein the elastic part includes a folding portion and the through-hole is formed in the folding portion.

17. The pedal simulator of claim 16, further including:

a bracket mounted on the housing and coupled to the pedal.

18. The pedal simulator of claim 17, wherein the bracket is in plural and the plurality of the brackets are disposed, on an outer surface of the housing, to be spaced apart from each other.

* * * * *